United States Patent
Ehret et al.

[11] Patent Number: 5,668,724
[45] Date of Patent: Sep. 16, 1997

[54] METHOD FOR IMPROVING THE CONTROLLABILTY OF MOTOR VEHICLES

[75] Inventors: Thomas Ehret, Seelbach; Friedrich Kost, Kornwestheim; Uwe Hartmann; Rainer Erhardt, both of Stuttgart; Anton Van Zanten, Ditzingen; Gerd Busch, Gerlingen; Karl-Josef Weiss, Stuttgart; Wolf-Dieter Ruf, Waldstetten, all of Germany

[73] Assignee: Robert Bosch GmbH, Stuttgart, Germany

[21] Appl. No.: 526,280

[22] Filed: Sep. 11, 1995

Related U.S. Application Data

[63] Continuation-in-part of Ser. No. 859,438, filed as PCT/EP91/01837 filed Sept. 9, 1990, abandoned.

[30] Foreign Application Priority Data

Sep. 28, 1990 [DE] Germany .......................... 40 30 704.2

[51] Int. Cl.⁶ .................. G06F 7/70; G06G 7/76
[52] U.S. Cl. .................. 701/80; 303/146; 303/147; 303/113.4; 303/113.5; 180/197; 701/70; 701/71; 701/74; 701/79
[58] Field of Search .................. 364/426.01, 426.02, 364/426.03, 424.05, 424.01; 180/79.1, 140, 197, 142; 303/147, 113.4, 163, 165, 185, 198, 146, 9.62, 139, 145, 174, 140; 280/707; 395/900, 905; 73/510, 514.39

[56] References Cited

U.S. PATENT DOCUMENTS

| | | | |
|---|---|---|---|
| 3,980,346 | 9/1976 | Leiber | 303/6 |
| 4,320,459 | 3/1982 | Lindemann et al. | 364/426.02 |
| 4,679,809 | 7/1987 | Ito et al. | 364/424.05 |
| 4,706,771 | 11/1987 | Kawabe et al. | 364/424.05 |
| 4,763,262 | 8/1988 | Leiber | 364/426.03 |
| 4,805,104 | 2/1989 | Kishimoto et al. | 364/426.01 |
| 4,809,181 | 2/1989 | Ito et al. | 364/426.01 |
| 4,835,695 | 5/1989 | Walenty et al. | 364/426.02 |
| 4,866,618 | 9/1989 | Tamura et al. | 364/431.03 |
| 4,873,638 | 10/1989 | Shiraishi et al. | 364/426.02 |
| 4,873,639 | 10/1989 | Sato et al. | 364/426.02 |
| 4,902,076 | 2/1990 | Ushijima et al. | 364/426.02 |
| 4,916,618 | 4/1990 | Stoltman | 364/426.02 |
| 5,001,640 | 3/1991 | Matsumoto et al. | 364/426.01 |
| 5,012,417 | 4/1991 | Watanabe et al. | 364/426.02 |
| 5,063,514 | 11/1991 | Headley et al. | 364/426.02 |
| 5,075,859 | 12/1991 | Mayr-Frölich et al. | 364/426.02 |
| 5,079,708 | 1/1992 | Brown | 364/424.05 |
| 5,088,040 | 2/1992 | Matsuda et al. | 364/424.05 |
| 5,089,967 | 2/1992 | Haseda et al. | 364/426.02 |
| 5,126,942 | 6/1992 | Matsuda | 180/197 |
| 5,126,997 | 6/1992 | Fukuda et al. | 180/197 |
| 5,134,352 | 7/1992 | Matsumoto et al. | 318/587 |
| 5,188,434 | 2/1993 | Ruf | 303/111 |
| 5,255,194 | 10/1993 | Schaufelberger et al. | 364/426.02 |
| 5,275,475 | 1/1994 | Hartmann et al. | 303/103 |
| 5,303,989 | 4/1994 | Yasuno et al. | 303/11 |
| 5,332,300 | 7/1994 | Hartmann et al. | 364/426.02 |

FOREIGN PATENT DOCUMENTS

| | | |
|---|---|---|
| 3826982 | 2/1989 | Germany . |
| 3731756 | 3/1989 | Germany . |
| 3819474 | 11/1989 | Germany . |
| 3825639 | 2/1990 | Germany . |
| 3840456 | 6/1990 | Germany . |
| 9009301 | 8/1990 | WIPO . |

*Primary Examiner*—Jacques Louis-Jacques
*Attorney, Agent, or Firm*—Spencer & Frank

[57] ABSTRACT

A method for improving the controllability of motor vehicles during braking wherein desired slip values are determined and adjusted with the aid of a wheel slip controller. According to the method, the following are measured: the yaw rate $\dot\psi$, the steering angle $\delta$, the wheel speeds $V_{Ri}$, the inlet pressure $P_{inlet}$ or wheel brake pressure $P_i$, and, if required, the engine speed and the throttle valve angle. The following variables are estimated using the measured values: the longitudinal vehicle speed $\hat{V}_X$, the longitudinal vehicle acceleration $\hat{\dot V}_X$, the wheel slip values $\hat\lambda_i$, the braking forces $\hat F_{Bi}$, the tire forces $\hat F_{Ri}$, and the transverse speed $\hat V_Y$. Desired slip values $\lambda_i^*$ are then determined from these measured and estimated variables with the aid of a simple vehicle model and supplied to the slip controller to control the vehicle wheel brake pressure.

2 Claims, 5 Drawing Sheets

METHOD FOR IMPROVING THE CONTROLLABILTY OF MOTOR VEHICLES

This application is a continuation-in-part of application Ser. No. 07/859,438, filed Jul. 28, 1992, now abandoned, which is a National Stage Application filed under 35 U.S.C. §371 of PCT/EP91/01837 filed Sep. 26, 1991.

PRIOR ART

In conventional ABS/ASR systems, the longitudinal dynamics of the vehicle are to the fore. Stability and controllability of the vehicle are not directly controlled, but are the product of invariant compromises in the design of the ABS/ASR controller, which cannot be optimal in all driving situations with regard to transverse dynamics and braking distance/acceleration.

It is known from German Offenlegungsschrift 3,840,456 corresponding to U.S. Pat. No. 5,188,434, issued Feb. 23, 1994 to increase the controllability of a vehicle by determining the slip angles present at the axles and deriving herefrom desired slip values which where met increase the controllability of the vehicle.

SUMMARY AND ADVANTAGES OF THE INVENTION

The present invention comprises a method for improving the controllability of motor vehicles during braking, wherein: desired slip values $\lambda_{des}$ or $\lambda_i^*$ are determined for the individual wheels with the aid of the measured variable of yaw rate $\dot{\psi}$ and the determined longitudinal speed $\hat{V}_x$, and the wheel slips $\hat{\lambda}_i$ are adjusted accordingly at at least some of the wheels by means of an ABS or ASR; in addition to the measured variable of yaw rate $\dot{\psi}$, the wheel speeds $V_{Ri}$, the steering angle $\delta$, the inlet pressure $P_{inlet}$ or the wheel brake cylinder pressures $P_i$ and, if necessary, the engine speed and the throttle valve angle, are measured; and the longitudinal vehicle speed $\hat{V}_x$, the longitudinal vehicle acceleration $\hat{V}_x$, the wheel slip values $\hat{\lambda}_i$ and the longitudinal tire forces $\hat{F}_{Bi}$ are estimated therefrom; the variables $\hat{V}_x$, $\hat{V}_x$ and $\hat{\lambda}_i$ are fed to a vehicle controller; the variables $\hat{V}_x$, $\hat{\lambda}_i$ and $\hat{F}_{Bi}$ are fed to an observer for estimating the tire forces $\hat{F}_R$ and the transverse speed $\hat{V}_Y$, which estimated values are then passed by the observer to the vehicle controller; and, desired slip values $\hat{\lambda}_i^*$ at the wheels are determined in the vehicle controller with the aid of a simple model, and are adjusted using an ABS or ASR.

By contrast with this prior art, here the invention undertakes a model-aided controller design. This has the advantage that the controller gains are continuously recalculated in accordance with the driving situation and the roadway conditions. The two-track model and the tire model used here yield substantially better results than the otherwise frequently used single-track models. The controller design is carried out on the basis of a Kalman filter design and is therefore very effective in terms of computing time.

Moreover, the interventions are performed here, if necessary, on all four wheels and the distribution to the wheels is performed from the point of view of force optimisation. The intervention itself is performed by turning the force directions at the individual wheels as a result of the changes in slip. A novel feature is the use of a multi-variable state control. The state variables of attitude angle and yaw rate can be controlled independently of one another within the physical limits.

The higher-level driving dynamics control according to the invention leads to improvements in the driving stability and vehicle controllability simultaneously with optimisation of the tractive/braking force.

DETAILED DESCRIPTION OF THE PREFERRED EMBODIMENT

The first step in carrying out the method according to the invention is to derive a simple, plane model of a four-wheel road vehicle, with the aid of which a control device is then designed for the handling in all driving conditions.

Figure 1:
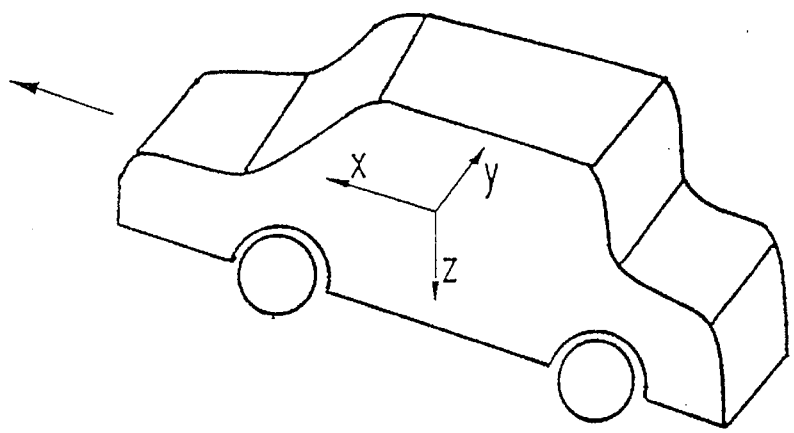
FIGS. 1 and 2 are schematic perspective and plan views of a wheeled vehicle which shows the geometric relationship between various of the quantities, both measured and determined and used in explaining the method according to the invention.
Figure 2:
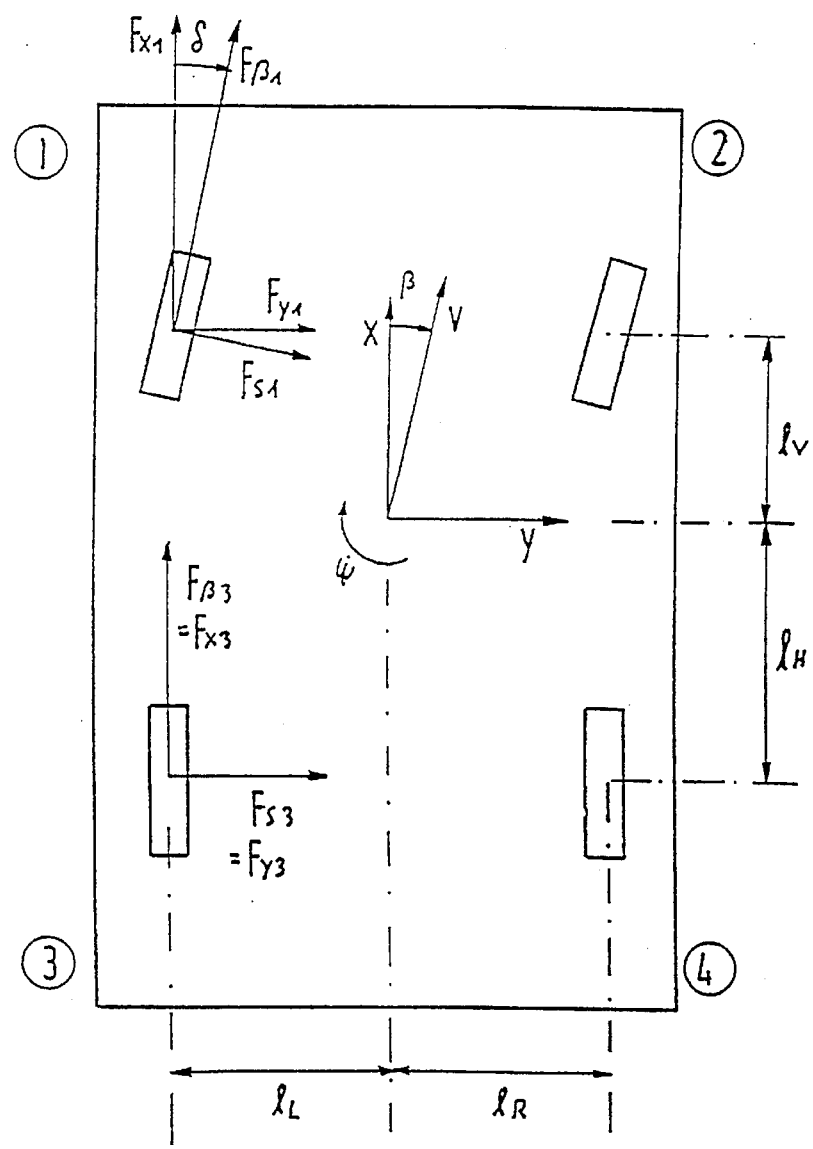

The model is of second order in the state variables of yaw rate $\dot{\psi}$ and attitude angle $\beta$ (see FIG. 1 and FIG. 2 and list of abbreviations at the end of the description).

It holds for the attitude angle that:

$$\beta = \arctan \frac{V_Y}{V_X}$$

$$\beta \approx \frac{V_Y}{V_X} \quad (V_X \text{ is the longitudinal speed, } V_Y \text{ the transverse speed})$$

It therefore holds for the temporal variation that:

$$\dot{\beta} = \frac{d}{dt}\left(\frac{V_Y}{V_X}\right) = \frac{\dot{V}_Y V_X - V_Y \dot{V}_X}{V_X^2}$$

It holds for relative movements that:

$$\dot{V}_Y = A_Y - \dot{\psi} \cdot V_X.$$

$_Y$ being the transverse acceleration.
The differential equation for the attitude angle is therefore:

$$\dot{\beta} = -\beta \frac{\dot{V}_X}{V_X} - \dot{\psi} + \frac{a_Y}{V_X} \tag{1}$$

The transverse acceleration $a_y$ can be determined from the sum of the forces $F_Y$ acting at the tires transversely on the vehicle (see FIG. 2).

$$a_y = \frac{1}{m} \sum_{i=1}^{4} F_{yi} \quad m = \text{vehicle mass}$$

In order to determine the transverse forces given a steering angle $\delta$ differing from zero, it is necessary to take account at the front wheels of the longitudinal forces ($F_B$) and the lateral forces ($F_S$) at the tires.

$$a_Y = \frac{1}{m} [(F_{S1}+F_{S2})\cos\delta + (F_{B1}+F_{B2})\sin\delta + F_{S3}+F_{S4}]$$

$$a_y = \frac{1}{m} \sum_{i=1}^{4} (g_i F_{Si} + h_i F_{Bi}) \quad (2)$$

where $$\underline{g} = \begin{bmatrix} \cos\delta \\ \cos\delta \\ 1 \\ 1 \end{bmatrix}; \underline{h} = \begin{bmatrix} \sin\delta \\ \sin\delta \\ 0 \\ 0 \end{bmatrix} \quad (3)$$

The differential equation for the yaw rate results from the torques from tire forces acting about the vehicle centre of gravity, and from the corresponding lever arms (see FIG. 2):

$$\ddot{\psi} = \frac{1}{\Theta} [1_L F_{X1} + 1_V F_{Y1} - 1_X F_{X2} + 1_V F_{Y2} + 1_L F_{X3} -$$

$$1_H F_{Y3} - 1_R F_{X4} - 1_H F_{Y4}]$$

where $$F_{X1} = \cos\delta \cdot F_{B1} - \sin\delta \cdot F_{S1}$$

$$F_{X3} = F_{B3}$$

$$F_{Y1} = \cos\delta \cdot F_{S1} + \sin\delta \cdot F_{B1}$$

etc.

It therefore holds that:

$$\ddot{\psi} = \frac{1}{\Theta} \sum_{i=1}^{4} (a_i F_{Si} + b_i F_{Bi}) \quad (4)$$

where $$\underline{a} = \begin{bmatrix} 1_V \cdot \cos\delta - 1_L \cdot \sin\delta \\ 1_V \cdot \cos\delta + 1_R \cdot \sin\delta \\ -1_H \\ -1_H \end{bmatrix} \quad (5)$$

$$\underline{b} = \begin{bmatrix} 1_L \cdot \cos\delta + 1_V \cdot \sin\delta \\ -1_R \cdot \cos\delta + 1_V \cdot \sin\delta \\ 1_L \\ -1_R \end{bmatrix}$$

Figure 3:
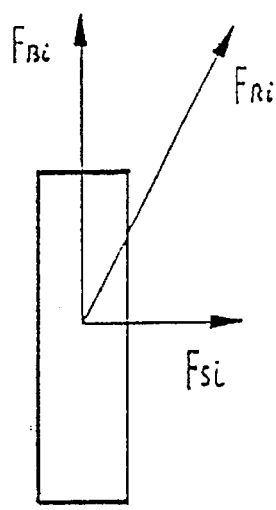
FIG. 3 is a schematic view showing the various forces exerted on a tire.

The approximate tire forces are obtained for a known tire slip and slip angle from the following relationship:

$$\begin{bmatrix} F_{Si} \\ F_{Bi} \end{bmatrix} = \begin{bmatrix} c_{\alpha i} \\ \lambda_i \end{bmatrix} \cdot \frac{\mu_R(s_i)}{s_i} \cdot F_{2i}$$

where (see FIG. 3, in this connection)

$$c = \frac{c_\alpha}{c_\lambda} \quad (6)$$

$$S_i = \sqrt{\lambda_i^2 + c^2 \alpha_i^2}$$

$$F_{Ri} = \mu_{Ri} \cdot F_{Zi}$$

It follows that:

$$\begin{bmatrix} F_{Si} \\ F_{Bi} \end{bmatrix} = \begin{bmatrix} c \cdot \alpha_i \\ \lambda_i \end{bmatrix} \cdot \frac{F_{Ri}}{\sqrt{\lambda_i^2 + c^2 \alpha_i^2}} \quad (7)$$

Figure 4:
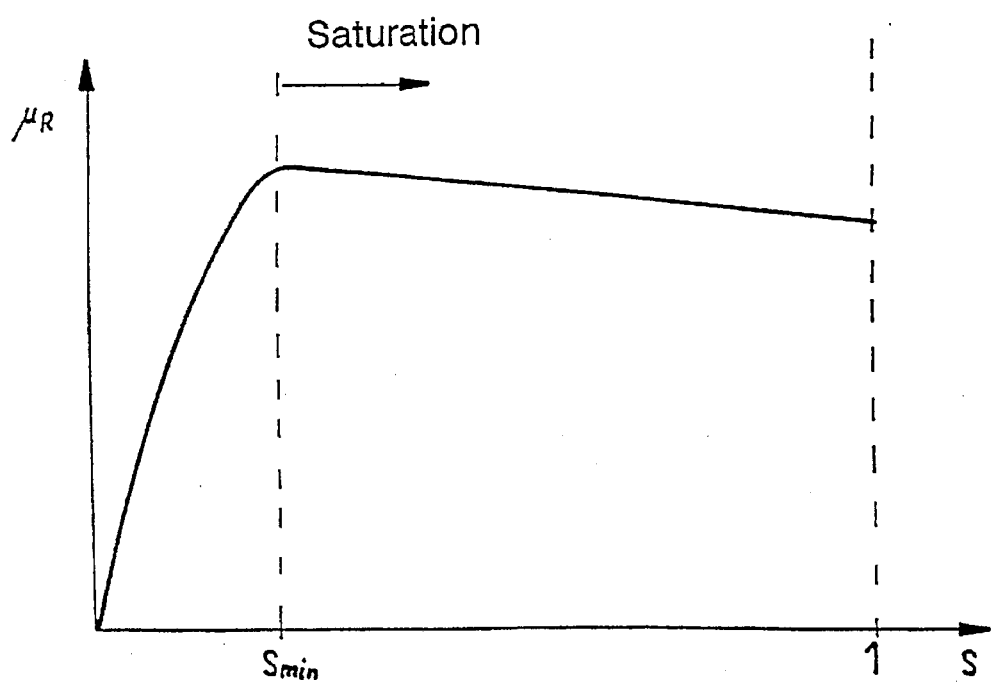
FIG. 4 is a graph showing the relationship between resultant tire slip and the adhesion coefficient.

There is a non-linear relationship, similar to that between the known tire slip $\lambda$ and the adhesion coefficient $\mu$ in the tire longitudinal direction, between the resultant tire slip $S_i$ and the resultant adhesion coefficient $\mu_{Ri}$. It is assumed below that during the ABS control the tire generally does not leave the region of saturation, that is to say that S is greater than $S_{min}$ (see FIG. 4). This can be achieved by means of sufficiently large slip and/or of sufficiently large slip angles at the wheels. It is ensured in this way that the maximum total force (resolved into longitudinal and transverse force) that can be transmitted between the roadway and tires is utilised to a large extent.

The size of the total force $F_R$ of each tire remains approximately constant in the range $S > S_{min}$. However, the direction of the resultant total force can be changed by a change in the tire slip or (indirectly via a turning of the vehicle) the slip angle. The action of the vehicle controller described here is based on this change in the force directions and, as a result of this, in the longitudinal and transverse forces and yawing moments acting on the vehicle.

Figure 5:
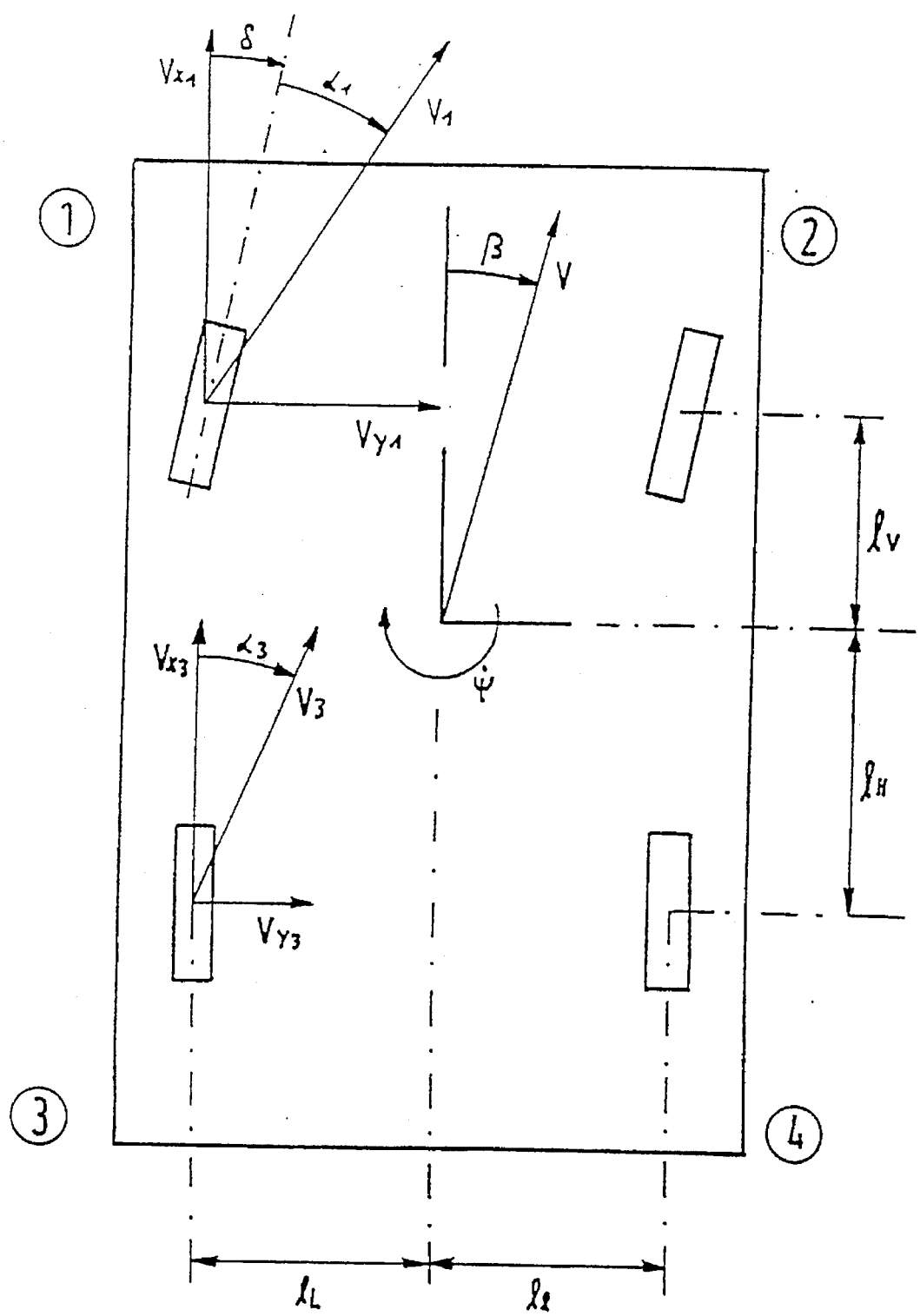
FIG. 5 is a schematic plan view of a wheeled vehicle showing the relationship between various angles used in explaining the method according to the invention.

The slip angles $\alpha_i$ at the tires can be specified as follows as a function of the state variables of attitude angle $\beta$ and of the yaw rate $\dot\psi$ and the steering angle $\delta$ (see FIG. 5).

It holds, for example, at front left that:

$$\alpha_1 = \arctan = \frac{V_{Y1}}{V_{X1}} - \delta \approx \frac{V_{Y1}}{V_{X1}} - \delta$$

$$\alpha_1 = \frac{V_Y + \dot\psi l_V}{V_X + \dot\psi l_L} - \delta$$

Since $\dot\psi \cdot 1_L$ is small by comparison with $V_X$, this can be simplified to give:

$$\alpha_1 = \beta + \frac{l_V}{V_X} \cdot \dot\psi - \delta$$

where $$\beta = \frac{V_Y}{V_X}$$

where

The same procedure can be adopted at front right and at the rear.

It therefore holds for the slip angles that:

$$\underline{\alpha} = \underline{1} \cdot \beta + \underline{e} \cdot \dot\psi + \underline{d} \cdot \delta \quad (8)$$

where $$\underline{e} = \begin{bmatrix} \frac{l_V}{V_X} \\ \frac{l_V}{V_X} \\ -\frac{l_H}{V_X} \\ -\frac{l_H}{V_X} \end{bmatrix}; \underline{d} = \begin{bmatrix} -1 \\ -1 \\ 0 \\ 0 \end{bmatrix} \quad (9)$$

The following system equations are thus yielded from (1), (2) and (3) and with (4), (5), (7) and (8):

$$\dot\beta = -\beta \frac{\dot V_X}{V_X} - \dot\psi + \frac{1}{m \cdot V_X} \sum_{i=1}^{4} [(g_i c\alpha_i + h_i \cdot \lambda_i)] \cdot \frac{F_{Ri}}{\sqrt{\lambda_i^2 + c^2 \alpha_i^2}} \quad (10)$$

$$\ddot\psi = \frac{1}{\Theta} \sum_{i=1}^{4} [(a_i c\alpha_i + b_i \lambda_i)] \cdot \frac{F_{Ri}}{\sqrt{\lambda_i^2 + c^2 \alpha_i^2}} \quad (11)$$

where $$\alpha_i = \beta + e_i \dot\psi + d_i \delta \quad (9)$$

The yaw rate can be directly measured using suitable sensors, for example fibre-optic gyros.

The steering angle can likewise be measured by means of devices already known.

The attitude angle and the tire forces can be determined approximately by an estimating algorithm (observer) in conjunction with a suitable wheel slip controller. Such an observer is described in German Patent Application P 40 30 653.4, corresponding to U.S. patent application Ser. No. 07/859,394.

Owing to the wheel speed sensors present in ABS/ASR devices, and to an appropriate evaluation, the vehicle longitudinal speed and acceleration are approximately known, as are the instantaneous wheel slip values at the individual wheels (German Patent Application P 40 24 815.1 corresponding to U.S. patent application Ser. No. 07/856,748). Here, the slip values form the manipulated variable of the controller, since they can be influenced via the brake pressure.

The parameters of steering angle, vehicle speed and acceleration and resultant tire forces are assumed to be slowly varying and thus quasistationary.

Estimated values can be taken for the vehicle parameters of mass, moment of inertia, position of centre of gravity and tire stiffnesses.

The vehicle model of second order is thus completely known and can be used as the basis for controller design.

For this purpose, the system is firstly linearised about temporarily variable operating points. The operating points are chosen as physically realisable values for the attitude angle β and the yaw rate ψ, for example the instantaneously desired value.

Non-linear system:

$$\dot{\underline{Y}} = f(\underline{Y}, \underline{\lambda}, t)$$

where $$\underline{Y} = \begin{bmatrix} \beta \\ \psi \end{bmatrix}; \underline{\lambda} = \begin{bmatrix} \lambda_1 \\ \lambda_2 \\ \lambda_3 \\ \lambda_4 \end{bmatrix}$$

Linearisation:

Operating points of the state variables $\underline{Y}$ (for example desired trajectory): $\underline{Y}_o(t)$ Operating points of the manipulated variables $\underline{\lambda}$ (for example operating point of a subordinate wheel slip controller, without vehicle controller intervention):

$\underline{\lambda}_o(t)$ $$\underline{Y} = \underline{Y}_o + \underline{X}$$

$$\underline{\lambda} = \underline{\lambda}_o + \Delta\underline{\lambda}$$

$$\dot{\underline{X}} = f(\underline{Y}_o + \underline{X}, \underline{\lambda}_o + \Delta\underline{\lambda}, t) \cdot \dot{\underline{Y}}_o$$

$$\dot{\underline{X}} = f(\underline{Y}_o, \underline{\lambda}_o, t) + \frac{\partial f}{\partial \underline{Y}}\bigg|_o \cdot \underline{X} + \frac{\partial f}{\partial \underline{\lambda}}\bigg|_o \cdot \Delta\underline{\lambda} + \underline{r}(\underline{X}, \Delta\underline{\lambda}, t) \cdot \dot{\underline{Y}}_o$$

$$\dot{\underline{X}} = A\underline{X} + \underbrace{\frac{\partial f}{\partial \underline{\lambda}}\bigg|_o \cdot \Delta\underline{\lambda} + \underline{r} + [f(\underline{Y}_o, \underline{\lambda}_o, t) - \dot{\underline{Y}}_o]}_{\underline{z}}$$

The linearisation error r is neglected.

The first step in the controller design is to form two pseudo input variables U1' and U2'.

$$U1' = \sum_{i=1}^{4} \frac{\partial f_1}{\partial \lambda_i}\bigg|_o \cdot \Delta\lambda_i \quad (12)$$

$$U2' = \sum_{i=1}^{4} \frac{\partial f_2}{\partial \lambda_i}\bigg|_o \cdot \Delta\lambda_i$$

The system equation of the linearised system is thus:

$$\dot{\underline{X}} = A\underline{X} + B\underline{U} + \underline{Z} \quad (13)$$

where $$A = \frac{\partial f}{\partial \underline{Y}}\bigg|_o; B = \begin{bmatrix} 1 & 0 \\ 0 & 1 \end{bmatrix}$$

The term Z is treated as a disturbance variable which can be compensated via the manipulated variable.

For the controller design, the manipulated variables $\underline{U}'$ are split into the state variable feedback $\underline{U}$ and into the disturbance variable feedforward $\underline{U}_z$.

$$\underline{U}' = \underline{U} + \underline{U}_z \quad (14)$$

It holds for the disturbance variable feedforward that:

$$\underline{U}_z = -B^{-1} \cdot \underline{Z} = -\underline{Z}$$

The controller design is carried out for:

$$+e, \dot{X} + ee = A \cdot \underline{X} + B \cdot \underline{U} \quad (15)$$

If linearisation is carried out about the desired values, a command variable feedforward is not required. The control law is then:

$$\underline{U} = -F \cdot \underline{X}$$

The state variable feedback matrix F can be calculated, for example, using the known Riccati design.

In this case, known iterative and non-iterative methods are available for solving the non-linear matrix Riccati equation. In the iterative methods, the numerical difficulties are not to be underestimated, especially with regard to a real-time design, while non-iterative methods are eliminated from the very beginning because of the high numerical expenditure for determining the eigenvalues and eigenvectors of the Hamiltonian canonics system. For this reason, a method for determining optimum state feedbacks was developed which circumvents the abovementioned difficulties. The starting point is the system (15) set forth above.

$$\dot{\underline{X}} = A\underline{X} + \underline{U}$$

An Euler discretisation yields:

$$\underline{X}_{K+1} = \Phi_K \cdot \underline{X}_K + \hat{\underline{U}}_K$$

where $$\Phi_K = T \cdot A + I; \hat{\underline{U}}_K = T \cdot \underline{U}$$

where T is the scanning time.

The state feedback is selected as $$\hat{\underline{U}}_K = -F_K \cdot \underline{X}_K$$

It therefore holds that:

$$\underline{X}_{K+1} = (\Phi_K - F_K)\underline{X}_K \quad (16)$$

The feedback matrix $F_K$ is now to be determined such that it holds that:

$$E\{\underline{X}_K^T \cdot G \cdot \underline{X}_K\} \xrightarrow{F_K} \min. \quad (17)$$

where G is the weighting matrix, diagonally positively definite.

If $$G = M \cdot M$$

is selected with $$M = \begin{bmatrix} \sqrt{g_1} & 0 \\ 0 & \sqrt{g_2} \end{bmatrix}$$

it follows from (17) that:

$$E\{\underline{X}_K^T \cdot G \cdot \underline{X}_K\} = E\{(\underline{X} \cdot \underline{X}_K)^T \cdot (M \cdot \underline{X}_K)\} \xrightarrow{F_K} \min. \quad (18)$$

If the new state vector $$\underline{Z}_K = M \cdot \underline{X}_K$$

is introduced, it follows from (16) that:

$$\underline{Z}_{K+1} = (\Phi_K^* - F_k^*) \cdot \underline{Z}_K$$

and from (18) that:

$$E\{\underline{Z}_K^T \cdot \underline{z}_K\} \xrightarrow{E_K^*} \min. \quad (19)$$

where $$\Phi_K^* = M \cdot \Phi_K \cdot M^{-1}; \quad E_K^* = M \cdot F_K \cdot M^{-1}$$

It follows from comparing (19) with the estimation error equation of an observer and the associated performance index $$\underline{e}_{K+1} = (A_K - K_K \cdot C) \underline{e}_K \quad (20)$$

$$E\{\underline{e}_K^T \cdot \underline{e}_K\} \xrightarrow{K_K} \min.$$

that (19) and (20) are formally equivalent, given selection of C=I. This means that it is possible for the purpose of calculating $F_K^*$ to use algorithms for calculating optimum state observers. In this case, the Kalman filter is particularly suitable by reason of its recursive structure.

The equations for calculating $F_K^*$ are:

$$F_K^* = P_K^* \cdot (P_K^* + R_K)^{-1}$$

$$\bar{P}_K = P_K^* - F_K^* \cdot P_K^*$$

$$P_{K+1}^* = \Phi_K^* \cdot \hat{P}_K \cdot \Phi_K^{*T} + Q_K$$

where $$R_K = \begin{bmatrix} r_1 & 0 \\ 0 & r_2 \end{bmatrix}; \quad Q_K = \begin{bmatrix} q_1 & 0 \\ 0 & q_2 \end{bmatrix}$$

The input variable in equation (15) is thus yielded as:

$$\underline{U} = -\frac{M^{-1} \cdot F_K^* M}{T} \cdot \underline{X} = -F \cdot \underline{X}$$

Two degrees of freedom are available for converting the two pseudo input variables $\underline{U}'$ (14) into the four manipulated variables $\Delta \underline{\lambda}$. These can be used for the purpose of maximising the longitudinal retardation and thus the braking force in the vehicle longitudinal direction, in order to achieve as short a braking distance as possible for a given vehicle response (with regard to lateral and yaw movement).

The equation for the longitudinal acceleration (see FIG. 2) is $$a_X = \frac{1}{u} \sum_{i=1}^{4} F_{Y_i} = \frac{1}{n} [(F_{B1} + F_{B2})\cos\delta \cdot (F_{S1} + F_{S2})\sin\delta + F_{B3} + F_{B4}]$$

or with (3), (7) and (8):

$$a_x = \frac{1}{m} \sum_{i=1}^{4} \left[ (g_i\lambda_i - h_i c\alpha_i) \frac{F_{Ri}}{\sqrt{\lambda_i^2 + c^2\alpha_i^2}} \right]$$

where
$$\lambda_i = \lambda_{o_i} + \Delta \lambda_i$$

It holds for the maximum longitudinal retardation that:

$$a_X \stackrel{!}{=} \min$$

The equations (12) must be fulfilled as secondary conditions for the task of minimisation:

$$\sum_{i=1}^{4} \frac{\partial f_1}{\partial \lambda_i} \bigg|_0 \cdot \Delta\lambda_i - U_1' = 0$$

$$\sum_{i=1}^{4} \frac{\partial f_2}{\partial \lambda_i} \bigg|_0 \cdot \Delta\lambda_i - U_2' = 0$$

It is necessary, furthermore, to pay regard to limitations on the variables $\lambda_i$, since the wheel brake slip can assume values only between zero and one.

$$\Delta\lambda_{min\,i} \leq \Delta\lambda_i \leq \Delta\lambda_{max}$$

The desired values for the attitude angle $\beta$ and for the yaw rate $\dot{\psi}$ can be determined in accordance with the desired handling. In this case, the desire to change direction stipulated by the driver through the steering angle must be converted into corresponding desired values taking account of the vehicle speed and the roadway conditions.

EXAMPLE

Desired value for $\dot{\psi}$:

$$\dot{\phi}_{des} = \frac{V_X}{(l_V + l_H) \cdot \left(1 + \frac{V_X^2}{V_{Ch}^2}\right)} \cdot \delta$$

$V_{Ch}$ is in this case a constant which influences the handling at higher speeds. In the event of a large steering angle, high vehicle speed or low coefficient of friction of the roadway, this raw value must be limited to a sensible value, since otherwise the yaw rate becomes larger than the maximum possible angular rate of change of the path curve. The attitude angle then increases and the vehicle swerves.

In order to avoid this it is, for example, determined which component of the maximum available total force may be assumed by the transverse force.

$$F_{Ymax} = f_Y \cdot F_{max}$$
$$= f_Y \sum_{i=1}^{4} |F_{Ri}|$$

where
$$0 < f_Y < 1$$

It is then possible from this to calculate a maximum yaw rate for stationary cornering.

$$\dot{\psi}_{max} = \frac{a_{Ymax}}{V_X} = \frac{F_{Ymax}}{m \cdot V_X}$$

$$\dot{\psi}_{max} = \frac{f_Y \sum_{i=1}^{4} |F_{Ri}|}{m \cdot V_X}$$

$$|\dot{\psi}_{des}| \overset{!}{\leq} \dot{\psi}_{max}$$

Apart from genuine desired values, it is also possible to prescribe for the attitude angle bounds which prevent the attitude angle from becoming too large. A system deviation in the first state variable is produced in this case only if the amount of the attitude angle exceeds its bound. The bound can, for example, be fixed such that given a brake slip of zero the resultant slip S at the rear wheels does not substantially exceed the saturation limit $S_{min}$ (see FIG. 4, (6)).

Figure 6:
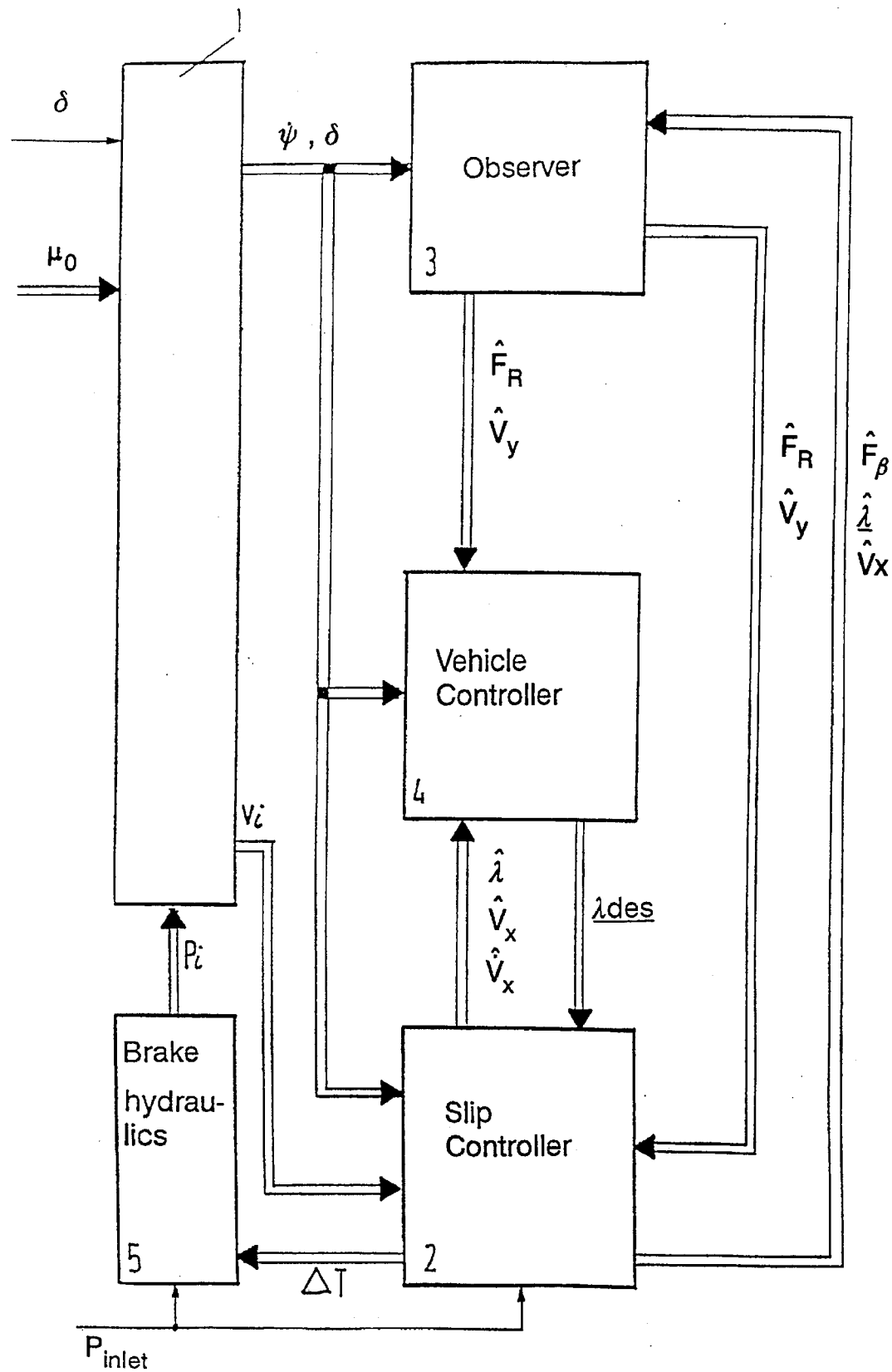
FIG. 6 is a block diagram showing an overview of the system used in carrying out the method according to the invention for an ABS type control, and showing the various values which are measured and/or determined or estimated.

The vehicle controller described above can be confined with an algorithm for estimating the corresponding vehicle speed and the tire forces (e.g. see P 40 30 653.4 Appendix I and U.S. patent application Ser. No. 07/859,394) and with another algorithm for adjusting the desired slip values prescribed at the individual wheels by the vehicle controller (for example German Patent Applications P 40 30 724.7 in Appendix III, and P 40 24 815.1 in Appendix II and corresponding to U.S. patent application Ser. No. 07/856, 748 ). FIG. 6 shows an overview of the entire system in the case of ABS.

The vehicle 1 is acted upon from outside by the steering angle $\delta$ and the adhesion coefficient $\mu_o$. The wheel speeds $V_{Ri}$, the steering angle $\delta$ and the yaw rate $\dot{\psi}$ are measured at the vehicle 1, as also, possibly, are the inlet pressure $P_{inlet}$ of the brake system or the individual wheel brake cylinder pressures $P_i$. In addition, in the case of ASR controllers, the engine speed and the throttle valve angle, for example, are measured. With the aid of the variables delivered by an observer 3, a slip controller 2 estimates therefrom the braking forces $\hat{F}_B$ and the vehicle longitudinal speed $\hat{V}_X$ and acceleration $\hat{V}_X$. As a result, the wheel slip values $\lambda_i$ of the individual wheels are also known. Using this information, the observer 3 can estimate the transverse vehicle speed $\hat{V}_Y$ and the lateral forces $\hat{F}_S$ at the tires, and thus also the resultant tire forces $\hat{F}_R$. Consequently all the variables are known which are required by a vehicle controller 4 in accordance with the method described above in order to determine the desired slip values $\lambda_{des}$. The desired slip values are then passed on to the slip controller 2 which adjusts them by changing the wheel brake pressures $P_i$ by means of the brake hydraulics 5. Moreover, in the case of ASR controllers the engine torque can be changed by the controller.

Figure 7:
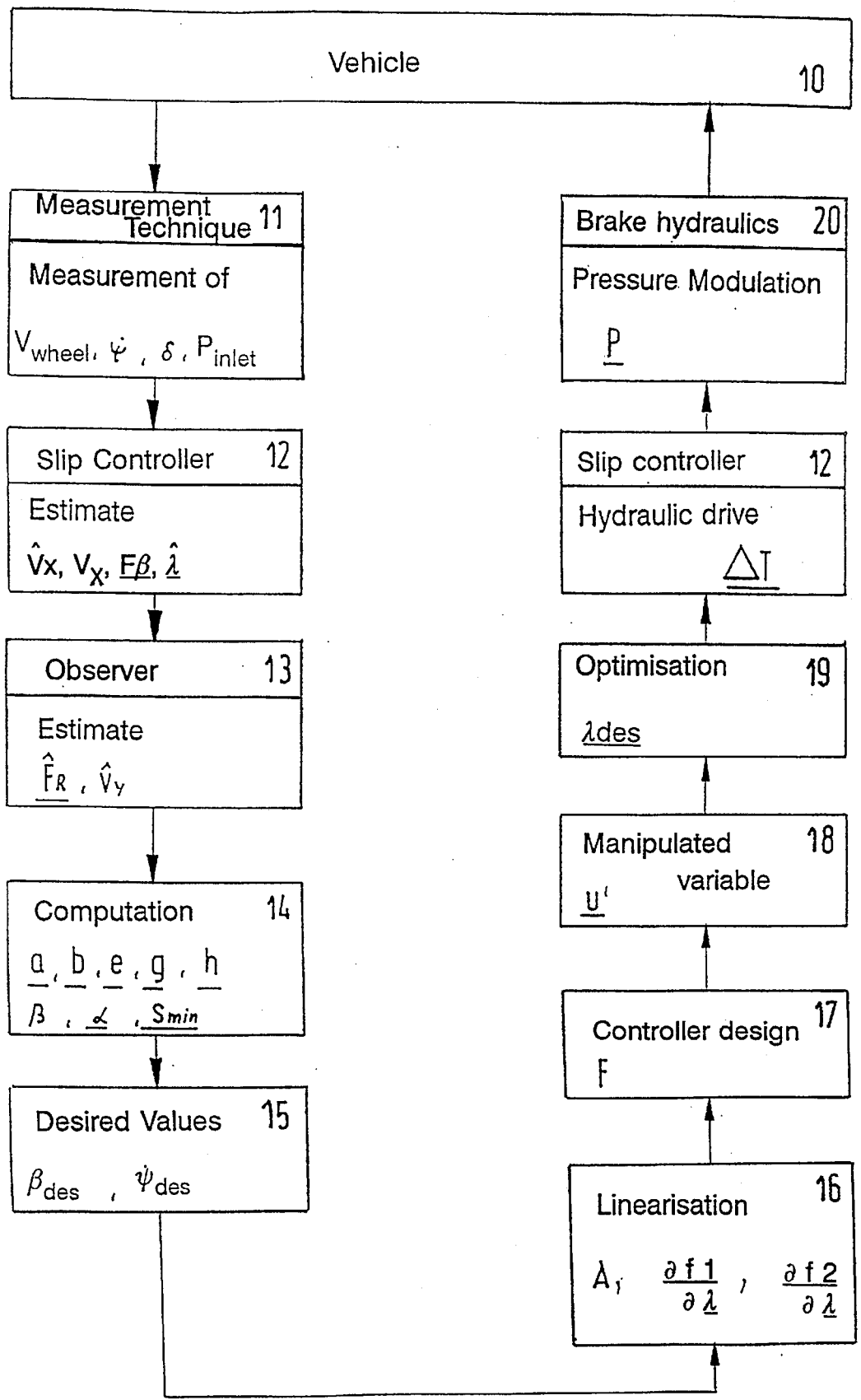
FIG. 7 is a rough flow diagram of an embodiment of the method according to the invention.

FIG. 7 shows a rough flow diagram of the method by way of example.

This method cam be converted into a programming language and implemented on a suitable digital computer (microprocessor). By contrast with conventional ABS/ASR systems, it offers an increased vehicle stability (reliable prevention of swerving processes), an improved steerability in conjunction with steering behaviour which can be prescribed by the desired values, and in the case of steering manoeuvres a better utilisation of the adhesion potential of the roadway, and thus a shorter braking distance or a better vehicle acceleration. The compromises required in conventional systems in order to control all the driving and road situations which arise are largely eliminated.

The control concept described here can be used in all driving situations, not only in the case of ABS/ASR operation.

Block 10 represents the vehicle. A measurement technique block 11 on the vehicle is used to measure the wheel speeds $V_{Ri}$, the yaw rate $\dot{\psi}$, the steering angle $\delta$ and the inlet pressure $P_{inlet}$ or the wheel brake pressures $P_i$. The variables of longitudinal speed $\hat{V}_X$, longitudinal acceleration $\hat{V}_X$, braking forces $\hat{F}_{Bi}$ and slip values $\hat{\lambda}_i$ are estimated herefrom in a slip controller 12 (for example in accordance with Appendix I). The tire forces $\hat{F}_R$ and the transverse speed $\hat{V}_Y$ are estimated here from by an observer 13. The values for the attitude angle $\beta$, the slip angles $\alpha_i$, and the minimum slip $S_{min}$ can be determined herefrom in a block 14. The desired values $\beta_{des}$ and $\dot{\psi}_{des}$ are yielded herefrom in a block 15.

In block 16, the now known measured and estimated values, the vehicle parameters (for example, vehicle mass m) and the desired values, used here as operating points $\underline{X}_o$, $\beta_{des}$ and $\dot{\psi}_{des}$ are substituted in the linearisation equations, already calculated in advance, of the vehicle model. This produces the system matrix A and the gain factors $\partial f_1 / \partial \lambda_i$ and $\partial f_2 / \partial \lambda_i$, which describe the influence of slip changes on the system behaviour.

A controller design can now be carried out in block 17 for the now known, linearised system (see equation (15)), as described, resulting in the state variable feedback matrix F.

The system deviation $\underline{X}$, the feedback matrix F and the disturbance variable feedforward $\underline{U}_Z$ are used in block 18 to calculate the pseudo manipulated variable $\underline{U}'$ (see equation (14)). The slip values $\lambda_{des}$ are now calculated in accordance with the described method of longitudinal force optimisation such that the desired manipulated variables $\underline{U}'$ are realised (see equation (12)).

The desired slip values $\lambda_{des}$ are once again fed to the slip controller 12, which converts them into brake pressures $P_i$ via the brake hydraulics 20.

The vehicle control concept so far described can, if required, be changed or expanded.

When the vehicle is appropriately equipped, the described control concept can also be used to control the steering angle at the rear wheels in addition to the wheel slip values. This requires the introduction of an additional variable $\delta_H$ for the rear wheel steering angle.

After linearisation of $\delta_H$ about $\delta_H = 0$, the equation for the transverse acceleration (2) is:

$$a_Y = \frac{1}{m} \sum_{i=1}^{4} [q_i F_{Si} + (b_i + b_{Hi} \cdot \delta_H) \cdot F_{Si}]$$

where $$\cos\delta_H = 1; \sin\delta_H = \delta_H$$

The definitions (3) are supplemented by:

$$\underline{b_H} = \begin{bmatrix} 0 \\ 0 \\ 1 \\ 1 \end{bmatrix}$$

The equation (4) for the yaw acceleration is now:

$$\ddot{\psi} = \frac{1}{\Theta} \sum_{i=1}^{4} [(a_i + a_{Hi})F_{Si} + (b_i + b_{Hi})F_{Bi}]$$

The definitions (5) are supplemented by:

$$\underline{a_H} = \begin{bmatrix} 0 \\ 0 \\ -l_L \\ l_R \end{bmatrix} \; ; \; \underline{b_H} = \begin{bmatrix} 0 \\ 0 \\ -l_H \\ -l_H \end{bmatrix}$$

After introduction of the rear wheel steering angle, the equation (8) for the slip angle is:

$$\underline{\alpha} = \underline{1} \cdot \beta + \underline{e} \cdot \psi + ee \; ++ e, uns \; d \cdot \delta + \underline{d_H} \cdot \delta_H$$

with the additional definition (9):

$$\underline{d_H} = \begin{bmatrix} 0 \\ 0 \\ -1 \\ -1 \end{bmatrix}$$

The linearisation of the system $$+e, dot \; \underline{Y} + ee = \underline{f}(\underline{Y}, \underline{\lambda}, \delta_H, t)$$

must additionally be carried out for the new manipulated variable $\delta_H$, it being possible to select $\delta_{Ho}=0$ as operating point.

The equations (12) for the pseudo input variables are then:

$$U_1' = \sum_{i=1}^{4} \frac{\partial f_1}{\partial \lambda_i}\bigg|_o \cdot \Delta\lambda_i + \frac{\partial f_1}{\partial \delta_H}\bigg|_o \cdot \delta_H$$

$$U_2' = \sum_{i=1}^{4} \frac{\partial f_2}{\partial \lambda_i}\bigg|_o \cdot \Delta\lambda_i + \frac{\partial f_2}{\partial \delta_H}\bigg|_o \cdot \delta_H$$

An additional, third degree of freedom is therefore available for braking force optimisation.

The linearisation of the system (10), (11) can also be carried out, apart from about the desired projectory, about other operating points of the state variables $\underline{Y}_o$, for example about the undisturbed intrinsic movement of the system. In this case, apart from the state variable feedback matrix F it is also necessary to calculate a command variable feedback matrix W, since working point and desired value do not coincide. It is also possible, for example, to select the respective actual value of the slip as operating point for the manipulated variables $\underline{\lambda}_o$.

Apart from the Riccati design and the controller design, described above, via Kalman filters, it is also possible to use another method of controller design, for example with the aid of polarity stipulation.

There are also alternatives for the braking force optimisation described above which are less intensive in terms of computing time and lead to results which are only slightly worse. For example, the same desired slip value can be prescribed in each case on the left and right at the front and rear wheels. When the slip angles to the left and right are approximately equal, in accordance with equation (7) the ratio of lateral to braking force and thus the direction of the resultant force $F_{Ri}$ is also virtually equal on the left and right in each case. The longitudinal retardation achieved in this connection is only insubstantially below that which can be achieved with the complete optimisation. The optimisation is eliminated, because owing to the two constraints $$\lambda_1 - \lambda_{01} = \lambda_2 - \lambda_{02}$$

and $$\lambda_3 - \lambda_{03} = \lambda_4 - \lambda_{04}$$

no more degrees of freedom are available.

The optimisation can also be simplified by omitting a stipulation of changes in slip at all the wheels. It is possible, for example, already to achieve good control results when in the case of braking while cornering intervention is undertaken only respectively at the front wheel on the outside of the curve and at the rear wheel on the inside of the curve. These two wheels generally make a substantially higher contribution to controlling the yaw speed, than do the wheels of the other vehicle diagonal.

A corresponding result holds for optimising the vehicle acceleration. It is possible in many cases to abandon the input variable $U_1'$ altogether. The input matrix is then:

$$B = \begin{bmatrix} 0 \\ 1 \end{bmatrix}$$

This must be taken into account in the controller design. The system can also be fully controlled even in the case of only one manipulated variable. Braking force optimisation requires only that the second equation (12) be taken into account.

When the model parameters are in any case not known precisely enough, it is possible to neglect the disturbance variables $\underline{Z}$ (13) without thereby causing control quality to suffer.

In special cases, such as strongly differing coefficients of static friction of the roadway under the wheels on the left and right, additional measures can be required to achieve satisfactory handling. The control concept described above, in which it is impermissible to leave the region of tire saturation (see FIG. 4), can lead in such cases to excessive yawing movement, and thus to vehicle instability. Improvements can be achieved by limiting the pressure differences or braking force differences at the rear wheels.

The permissible differences can be constant, or can rise in a controlled fashion after braking begins. Such solutions are already known under the name of yawing moment attenuation or yawing moment build-up retardation. Since in the control concept presented here the braking forces and the yaw movement are known, it is, however, possible to prescribe braking force differences that are more specifically permissible, depending on the driving condition.

If a secondary wheel controller is required for adjusting the prescribed slip values, phase shifts between the desired and actual value are unavoidable. This can be taken into account when designing the vehicle controller by including the typical wheel controller dynamics in the model. This leads, however, to a higher system order, and problems can thereby arise with the computing time. As an alternative to this, the phase shift of the secondary control law can be compensated approximately by introducing a D-component in the feedback of the state variables. The control law is then:

$$\underline{U} = -F(\underline{X} + K_D \underline{\dot{X}}).$$

Symbols employed

| | |
|---|---|
| $a_X$, $a_Y$ | Longitudinal/transverse acceleration at the centre of gravity of the vehicle |
| $c_\lambda$, $c_\alpha$ | Longitudinal/lateral stability of the tire |
| $F_{Bi}$, $F_{Si}$ | Tire forces in the longitudinal/transverse tire direction |
| $F_{Xi}$, $F_{Yi}$ | Tire forces in the longitudinal/transverse direction |
| $F_{Zi}$ | Normal force of the tire |
| m | Vehicle mass |
| $S_i$ | Resultant tire slip |
| $V_X$, $V_Y$ | Longitudinal/transverse vehicle speed at the centre of gravity |
| $\dot{V}_X$, $\dot{V}_Y$ | Temporal change in the longitudinal/transverse speed |
| $V_{Xi}$, $V_{Yi}$ | Longitudinal/transverse vehicle speed at the wheel |
| $V_{Ch}$ | Characteristic speed |
| $\alpha_i$ | Slip angle of the wheel |
| $\beta$ | Attitude angle of the vehicle at the centre of gravity |
| $\delta$ | Steering angle (front) |
| $\delta_H$ | Steering angle at the rear wheels |
| $\psi$ | Yaw rate |
| $\lambda_i$ | Tire slip |
| $\mu_{Ri}$ | Resultant adhesion coefficient |
| $\theta$ | Moment of inertia about the vehicle vertical axis |
| $l_V$, $l_H$, $l_L$, $l_R$ | geometrical dimensions (position of the centre of gravity) |
| A, B, ... | Matrices |
| $\underline{a}$, $\underline{b}$, $\underline{X}$, ... | Vectors |
| $\lambda^*_i$ | Desired slip |
| $V_{Ri}$ | Wheel speed |
| P | Inlet pressure |
| $P_i$ | Wheel brake pressure |
| $F_R$ | Total tire force |

We claim:

1. Method for improving the controllability of a wheeled vehicle during braking of wheels of the vehicle, comprising the steps of:

measuring yawing speed $\dot{\psi}$, wheel speeds $V_{Ri}$, steering angle $\delta$ and at least one of inlet pressure $P_{inlet}$ and wheel brake cylinder pressures $P_i$, where i represents a respective wheel and equals 1, 2, 3 or 4;

supplying these measured variables $\dot{\psi}$, $V_{Ri}$, $\delta$, and at least one of $P_{inlet}$ and wheel brake pressures $P_i$ to a slip controller and, from these measured variables, determining longitudinal vehicle speed $\hat{V}_X$, longitudinal vehicle acceleration $\hat{\dot{V}}_X$, respective wheel slip values $\hat{\lambda}_i$, and braking forces $\hat{F}_{Bi}$;

supplying the determined variables $\hat{F}_{Bi}$, $\hat{\lambda}_i$ and $\hat{V}_X$ to an observer which, with the aid of the measured variables $\hat{\lambda}$ and $\delta$, determines tire forces $\hat{F}_{Ri}$ and a vehicle transverse speed $\hat{V}_Y$ from these variables;

supplying the determined variables $\hat{V}_X$, $\hat{V}_{+e,sez\ x+ee}$, $\hat{\lambda}_i$, $\hat{F}_{Ri}$ and $\hat{V}_Y$ and the measured variables $\dot{\psi}$ and $\delta$ to a vehicle controller;

in the vehicle controller, and with the aid of a simple vehicle model and the determined and measured variables supplied to the vehicle controller, determining desired slip values $\lambda_i^*$ that effect a better controllability of the vehicle for the respective wheels;

supplying the desired slip values $\lambda_i^*$ to the slip controller; and via the slip controller, controlling the respective wheel brake cylinder pressures $P_i$ at the wheel brakes to achieve the desired slip values $\lambda_i^*$ at the respective wheels.

2. Method according to claim 1, wherein said step of supplying the desired slip values $\lambda_i^*$ to the slip controller includes feeding the desired slip values $\lambda_i^*$ to an antiblock/drive slip controller which generates its own desired slip values, and, superimposing a deviation between one of said desired slip values from the other on said desired slip values generated in the antiblock/drive slip controller.

* * * * *